United States Patent
Sindhgatta et al.

(10) Patent No.: US 8,387,001 B2
(45) Date of Patent: Feb. 26, 2013

(54) METHOD FOR FINDING AN IMPACT ON A COMPUTER GENERATED CODE

(75) Inventors: Renuka Sindhgatta, Bangalore (IN); Rajesh Balakrishnan, Bangalore (IN); Krishnakumar Pooloth, Bangalore (IN)

(73) Assignee: Infosys Technologies Limited, Bangalore, Karnataka (IN)

( * ) Notice: Subject to any disclaimer, the term of this patent is extended or adjusted under 35 U.S.C. 154(b) by 873 days.

(21) Appl. No.: 12/469,198

(22) Filed: May 20, 2009

(65) Prior Publication Data

US 2010/0100867 A1    Apr. 22, 2010

(51) Int. Cl.
*G06F 9/44*    (2006.01)

(52) U.S. Cl. ........ 717/105; 717/100; 717/104; 717/120; 717/122; 717/124

(58) Field of Classification Search .................. 717/105, 717/100, 104, 120, 122
See application file for complete search history.

(56) References Cited

U.S. PATENT DOCUMENTS

| | | | |
|---|---|---|---|
| 7,392,516 B2 * | 6/2008 | Vasilevskiy et al. | 717/159 |
| 7,409,676 B2 * | 8/2008 | Agarwal et al. | 717/120 |
| 2004/0034848 A1 * | 2/2004 | Moore et al. | 717/117 |
| 2004/0083468 A1 * | 4/2004 | Ogawa et al. | 717/151 |
| 2004/0268335 A1 * | 12/2004 | Martin et al. | 717/161 |
| 2006/0031823 A1 * | 2/2006 | Vasilevskiy et al. | 717/144 |

* cited by examiner

*Primary Examiner* — Idriss N Alrobaye
*Assistant Examiner* — Getente A Yimer
(74) *Attorney, Agent, or Firm* — Michael Best & Friedrich LLP (57) ABSTRACT

The present invention describes a method and a computer program product for finding an impact of a change on a computer generated code. The method includes the generation of a dependency graph for the computer generated code. The dependency graph includes a plurality of nodes that are connected logically by one or more edges. The method enables an expert to assign nodal weights to the nodes, based on their importance. The method also enables the expert to assign edge weights and distribution ratios, based on the criticality of the relationship between the nodes and their distance from the root node. Thereafter, the impact of the change is found by implementing a spreading activation technique on the dependency graph. The output gathered after the activation represents the impact of the change on the computer generated code.

10 Claims, 7 Drawing Sheets

METHOD FOR FINDING AN IMPACT ON A COMPUTER GENERATED CODE

BACKGROUND

The present invention relates to the field of software design and maintenance. More specifically, the present invention relates to finding an impact of a change in a parameter of a software system by implementing a spreading activation technique.

In the software industry, large-scale software systems are used in various business-critical processes. Typically, such software systems have a long shelf life and require maintenance over time to incorporate required modifications or functionality upgrades to them.

Modifications made in a software system include changes in its design, software code specifications, implementing the software system, maintaining the performance of the software system, ensuring the operation of the software system in different environments and its evolution, and the like. Hence, it is necessary to identify the effect of such modifications on the software system. Based on the identified effect on the software system, a software developer or expert can estimate the associated cost and effort.

Impact analysis is a technique, which helps in finding the effect of modifications made in a set of program instructions in a software system. Impact analysis also helps to determine the schedules, effort and cost estimates entailed in the complete life cycle of the software system.

Various techniques are available for conducting impact analysis. Examples of such techniques include, but are not limited to, program-slicing techniques and transitive closure on call graphs. Program-slicing techniques such as static program slicing techniques and dynamic program slicing are used for software maintenance and debugging.

Static program-slicing techniques use a collection of program instructions in the code of the software system, to detect their effect on the given variables, or the effect of the given variables on a collection of program instructions in the code of the software system. The accuracy of such static program-slicing techniques to identify relevant variables depends on the accuracy in the identification of the collection of statements and the given variables. This makes such slicing techniques computationally expensive.

Dynamic program-slicing technique detects the effect of the implementation of a collection of program instructions in the software code of a system on the given variables, or that of the given variables on a collection of program instructions in the software code. The detection for dynamic program-slicing technique is based on execution path traces. These execution path traces are the program execution paths that correspond to the different inputs. Sometimes, especially in the case of complex systems, these inputs are not available. Hence, different test cases need to be developed for such complex systems, which make the dynamic program-slicing techniques not only computationally expensive.

The techniques mentioned above may have a possible impact on a software system due to a change in the code of the software system. However, these techniques do not quantify the impact of these changes. Typically, the application of these techniques on object-oriented systems is complex due to the number of dependencies between the parts of the software systems. Further, the techniques mentioned above fail to identify the relationships between the various parts of the software system, to calculate the impact effectively.

In light of the foregoing, there is a need for a method for effectively finding the impact of a change on a software system. Further, such a method should be able to identify inter-relationships between various parts of the software system.

SUMMARY

An object of the invention is to find an impact due to a change in a computer generated code.

Another object of the invention is to find an impact on the computer generated code by applying a spreading activation technique.

Yet another object of the invention is to identify inter-relationships between the computer generated codes for the purpose of impact analysis.

To achieve the objectives mentioned above, the invention provides a method for finding an impact of a change on the computer generated code. The present invention describes a method for finding an impact made by a change implemented in a computer generated code. The method includes generating a dependency graph for the computer generated code. The dependency graph includes a plurality of nodes that are connected logically by one or more edges. The method also comprises assigning nodal weights to each of the nodes, edge weights and distribution ratios to the edges, based on a predefined criterion. Thereafter, at least one node of the plurality of nodes is activated by implementing a spreading activation technique. Subsequently, the impact on one or more nodes, connected logically to the at least one node, is found. The impact on the one or more nodes is found by gathering information relating to the output at the one or more nodes due to the activation of the at least one node.

The method provides a user with the flexibility in finding the impact due to various changes, thereby enabling the user to identify the critical methods. Further, the computational expense in finding the impact is less than that of the slicing techniques for finding the impact, since the method does not involve identifying a collection of statements or simulating test cases for complex systems. In addition, the method enables a quantification of the methods of the computer generated code by assigning nodal weights to the nodes and edge weights and distribution ratios to the edges. Hence, the dependency between the methods is also quantified. Therefore, the method enables the identification of the inter-relationships between the methods of the computer generated code, thereby enabling a user to identify the impact accurately.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DETAILED DESCRIPTION OF DRAWINGS

The present invention describes a method for finding an impact on a computer generated code. The method includes generating a dependency graph for the computer generated code. The dependency graph includes a plurality of nodes that are connected logically by one or more edges. Further, the method comprises assigning nodal weights to each of the plurality of nodes, based on a predefined criterion. Thereafter, at least one node of the plurality of nodes is activated by implementing a spreading activation technique. Subsequently, the impact on one or more nodes that are connected logically to the at least one node, is found. The impact on the one or more nodes is found by gathering information of relating to an output at the one or more nodes due to the activation of the at least one node.

Figure 1:
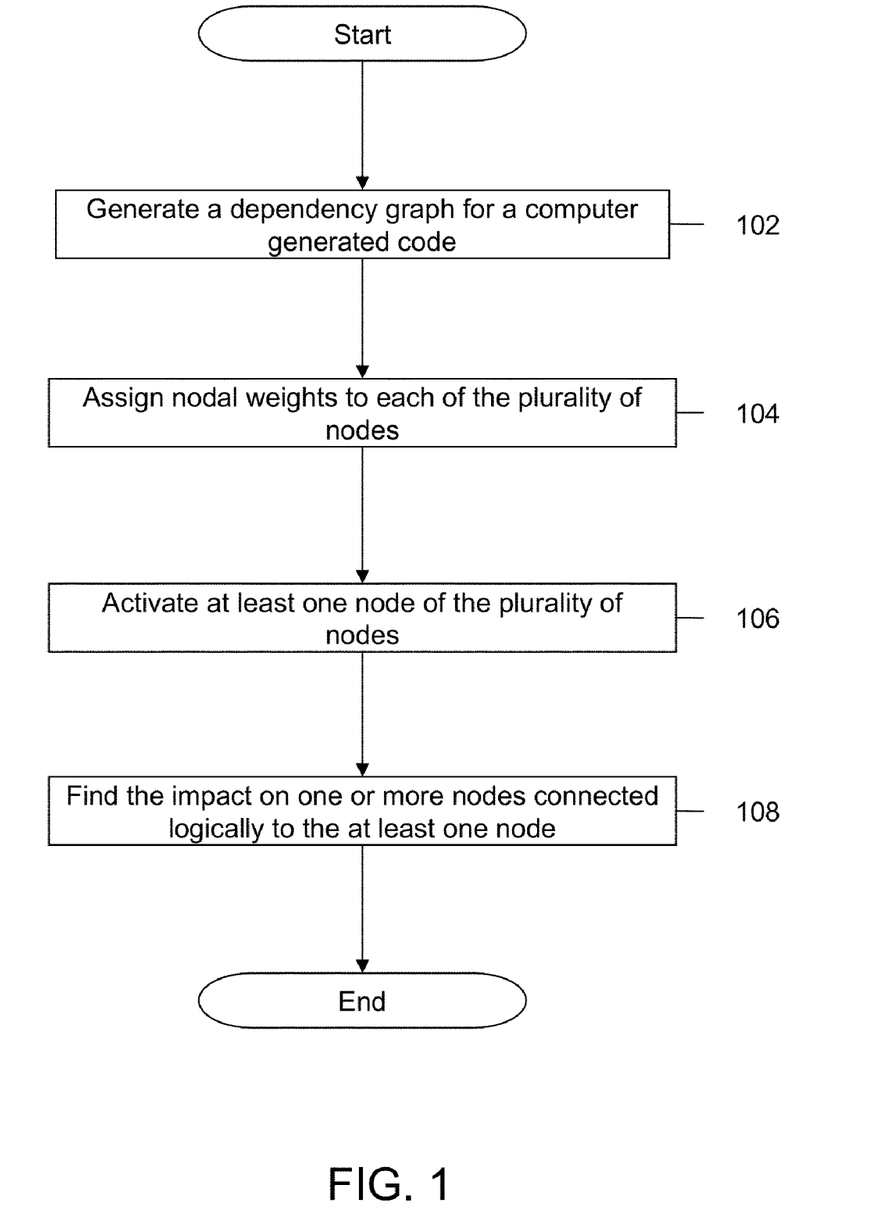
FIG. 1 is a flowchart of a method for finding an impact on a computer generated code, in accordance with an embodiment of the present invention.

FIG. 1 is a flowchart of a method for finding an impact on a computer generated code, in accordance with an embodiment of the present invention.

At 102, a dependency graph is generated for a computer generated code. The dependency graph includes a plurality of nodes that are connected logically by one or more edges. The computer generated code includes a plurality of classes. Each class includes one or more methods. These methods are represented by the nodes of the dependency graph. The nodes also include information pertaining to the methods and the corresponding classes.

In various embodiments of the invention, the classes interact with each other to generate the desired output of the computer generated code. To generate the desired output, the methods call one or more related methods, based on the corresponding dependencies. Further, these method calls are graphically represented by the edges of the dependency graph.

Thereafter, at 104, nodal weights are assigned to the nodes, based on a predefined criterion. In accordance with an embodiment of the invention, the nodal weights assigned to the nodes vary, based on the 'criticality' of a method. In an exemplary embodiment, a method implementing 'business logic' in the system has a higher nodal weight, as compared to a method for creating a 'log file' for the system.

Similarly, edge weights and distribution ratios are assigned to the edges, based on the predefined criterion. The distribution ratios are weights that are assigned to the edges based on the 'distance' of the nodes from a particular node in the dependency graph. In addition, the 'distance' of a selected node from the particular node corresponds to the number of nodes between the selected node and the particular node. The distribution ratio decreases as the number of nodes increases between the selected node and the connected node. In various embodiments of the present invention, the distribution ratio will reduce with the increase of distance of a node from the root node.

In accordance with an embodiment of the invention, the predefined criterion can be a user assigning the nodal weights, edge weights and distribution ratios. The user may be a software developer who is skilled in the art. In accordance with another embodiment of the invention, the predefined criterion is the automatic assignment of the nodal weights, edge weights and distribution ratios, based on a heuristic. In accordance with various embodiments, the edge weights vary, based on the importance of the edge or the relationship between the methods. In an exemplary embodiment, the edge weight for the edge connecting the nodes can be assigned as 1 or 0.75 if the relationship between two nodes is of 'high importance'.

Figure 2:
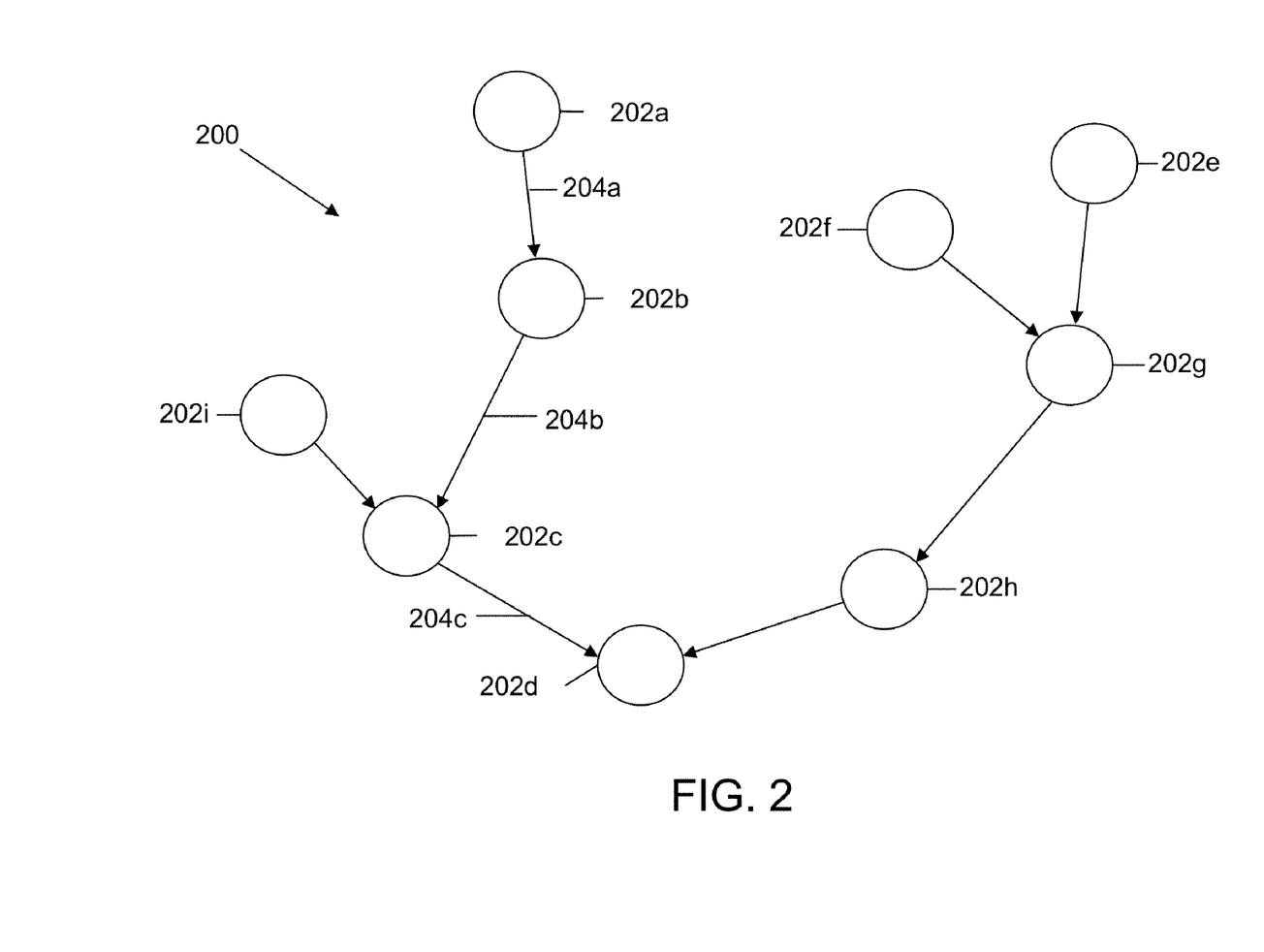
FIG. 2 illustrates an exemplary dependency graph, in accordance with various embodiments of the present invention.

In another exemplary embodiment, if a node, such as node 202*c*, has a method that is inherited from a connected node, such as node 202*b*, a change in the connected node, node 202*b*, will have a significant impact on node 202*c*. Hence, the edge weight of the edge connecting the nodes is assigned to be 1. However, if the relationship between the two nodes is of low importance, the edge weight can be assigned as 0 or 0.25.

Similarly, in accordance with an embodiment, the distribution ratios vary, based on the 'distance' of the nodes from the activated node. In an exemplary embodiment, the distribution ratio for an edge that connects an activated node, to an adjacent node is 1. Further, the distribution ratio of the edge connecting the adjacent node, to a third node can be assigned as 0.6.

At 106, at least one node of the plurality of nodes is activated by modifying the nodal weight of the at least one node. In order to find the impact of a change on the computer generated code, a set of nodes of the plurality of nodes are identified by a user, to introduce the change. In an exemplary embodiment, the user is a software developer who is skilled in the art. In another exemplary embodiment, the user is a programmer. The nodal weights of the set of nodes are then modified.

Subsequently, at 108, the impact on the computer generated code is found. The impact of the activation of the at least one node is found by gathering information pertaining to the output at one or more nodes connected logically to the at least one node, wherein the output is calculated, based on the nodal weights, edge weights and distribution ratios. Subsequently, the impact of the change on the computer generated code is found by gathering information of the output at the nodes of the dependency graph, due to the activation of all the nodes in the set of nodes.

FIG. 2 illustrates an exemplary dependency graph 200, in accordance with various embodiments of the present invention. Dependency graph 200 includes a plurality of nodes, such as nodes 202*a*, 202*b*, 202*c*, 202*d*, 202*e*, 202*f*, 202*g*, 202*h*, 202*i* and so forth, and so forth, which are hereinafter referred to as nodes 202. Dependency graph 200 also includes one or more edges, such as edges 204*a*, 204*b*, 204*c*, and so forth, which are hereinafter referred to as edges 204. Edges 204 connect nodes 202 logically. It will be apparent to one skilled in the art that dependency graph 200 is a sample graph of a software system and the present invention will be applicable to other possible graphs.

In various embodiments of the present invention, dependency graph 200 represents a computer generated code, which includes various classes. Each class includes one or more methods. The methods are represented by nodes 202. Nodes 202 further include information relating to the methods and the related classes. In addition, nodal weights are assigned to nodes 202, based on the predefined criterion.

Various classes interact with each other to generate the desired output of the computer generated code. To generate the desired output of the computer generated code, the methods call one or more related methods. The relationship between such methods is represented by edges 204 in dependency graph 200. Further, edge weights are assigned within a first predefined range to edges 204, based on the predefined criterion. In an exemplary embodiment of the invention, the first predefined range is between 0 and 1. Furthermore, distribution ratios are assigned with a second predefined range to edges 204, based on the predefined criterion. In an exemplary embodiment of the invention, the second predefined range is between zero and one.

In an embodiment of the present invention, dependency graph 200 is a method dependency graph.

Figure 3:
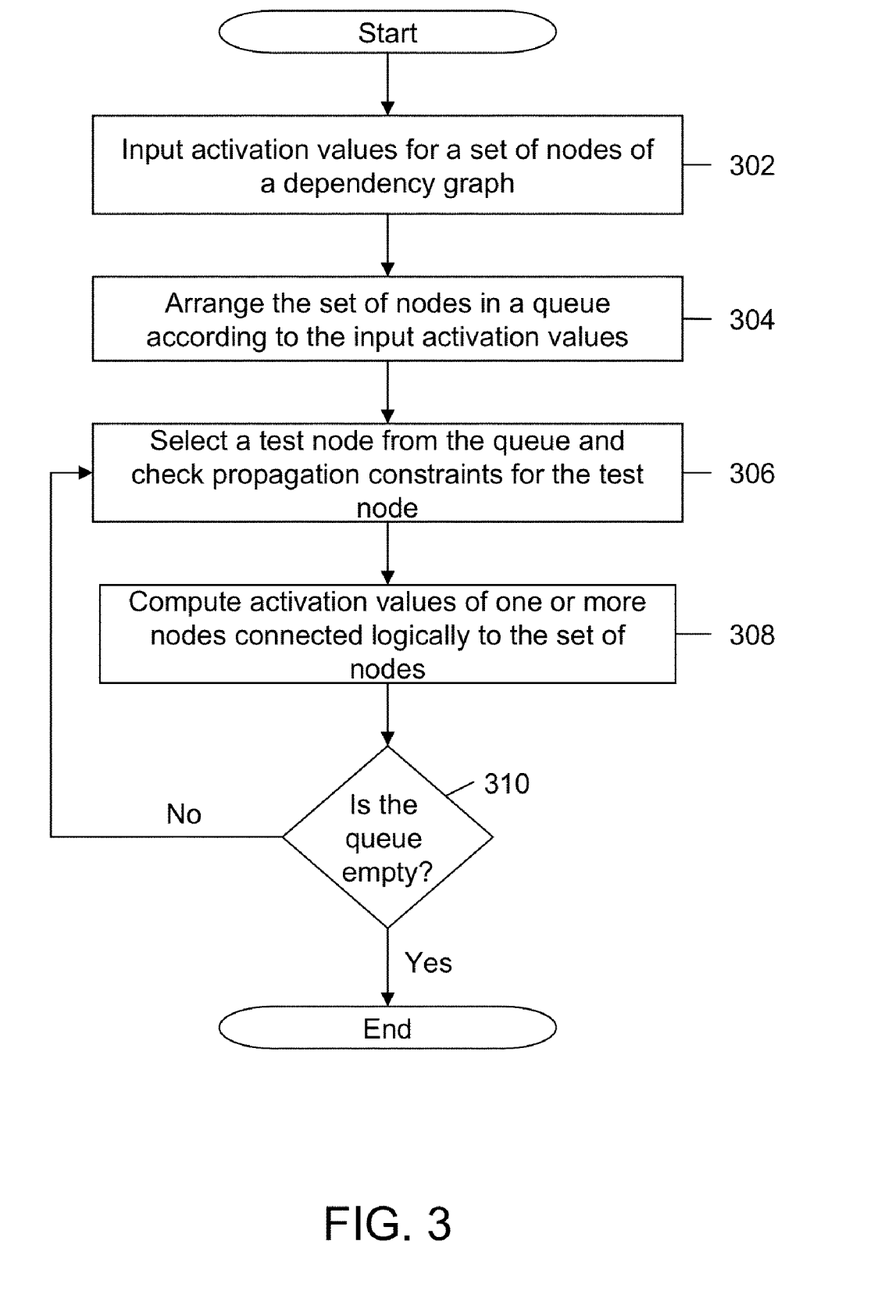
FIG. 3 is a flowchart of a method for implementing a spreading activation technique, in accordance with various embodiments of the present invention.

FIG. 3 is a flowchart of a method for implementing a spreading activation technique, in accordance with various embodiments of the present invention.

At 302, activation values of a set of nodes of a dependency graph, such as dependency graph 200, are provided by a user as an input. In an exemplary embodiment, the user is a software developer who is skilled in the art. In another exemplary embodiment, the user is a programmer. The dependency graph includes a plurality of nodes, such as nodes 202. The dependency graph also includes one or more edges, such as edges 204. Further, the nodes are connected logically by the edges. The computer generated code consists of various classes. Each class includes one or more methods, which are represented by the nodes. These nodes include information pertaining to the related classes. In addition, nodal weights are assigned to each of the nodes. In accordance with an embodiment, the nodal weights have a default value. In an exemplary embodiment, the default value of the nodal weights is 1.

To find the impact of a change in a computer generated code, the set of nodes are identified by the user, to introduce the change. The activation value of a node is its modified nodal weight. In an embodiment, the nodal weight is modified by assigning a different nodal weight to the node.

Various classes interact with each other to generate the desired output of the computer generated code. To generate the desired output, the methods call related methods. The method calls are represented by the edges in the dependency graph. Further, edge weights are assigned to the edges. In accordance with an embodiment of the present invention, the edge weights have a default value. In an exemplary embodiment, the default value of the edge weights is 1. In accordance with an embodiment, the edge weights are assigned within the first predefined range. In an exemplary embodiment, the first predefined range is between 0 and 1.

In addition, distribution ratios are assigned to the edges. In accordance with an embodiment, the distribution ratios have a default value. In an exemplary embodiment, the default value of the distribution ratios is 1. In accordance with an embodiment of the invention, the distribution ratios are assigned within the second predefined range. In an exemplary embodiment, the second predefined range is between 0 and 1.

After the assignment of nodal weights, edge weights and distribution ratios, the set of nodes, with their activation values, are arranged in a queue, according to the input of the activation values at 304.

Thereafter, at 306, a test node, such as node 202a, is selected and activated from the queue. The activation of the test node activates the one or more nodes that are logically connected to the test node, for example, nodes 202b, 202c, and so forth. Further, the activation of the one or more nodes that are logically connected to the test node is based on propagation constraints.

In various embodiments of the invention, propagation constraints ensure that the spreading activation technique does not activate all the nodes of the dependency graph. In an exemplary embodiment, propagation constraints include, but are not limited to, method-type, fan-in, depth, and impact constraints. The method type constraint prevents the activation of nodes of a given type, due to the activation of the at least one node. For example, a method for logging is a common method and can be used by all the methods in the dependency graph. Hence, there should be a constraint for stopping propagation at the logging method. The fan-in constraint checks the number of times a particular node is referred to by the other nodes before the particular node is activated. In an exemplary embodiment, an 'append method' of the Java Development Kit (JDK) string class may be referred to by several classes in a system. Hence, the change made to the append method will result in a change in a high number of methods. Therefore, there should be a constraint to check the number of times a node is referred to by other nodes.

The depth constraint prevents the activation of the nodes that are at a depth, which is higher than a threshold depth, wherein the depth is the distance of a node from the activated node. In an exemplary embodiment, the threshold depth is 2. Thus, when node 202a is activated, nodes 202b and 202c are in turn activated, whereas any other node which is connected to node 202c and is below the defined level 2 is not activated due to the depth constraint.

The impact constraint enables activation of the nodes till the impact on the nodes is higher than a threshold level. In an exemplary embodiment, if the threshold level is defined as 0.6 and node 202a is activated, then, the impact on node 202b is 0.8 due to the activation. Further, the impact on node 202c is 0.72 due to the activation. The impact on node 202d is 0.58 due to the activation of node 202a. Therefore, the impact constraint enables the activation of nodes 202b, 202c and 202d and also prevents propagation after node 202d, since the impact is less than the threshold level.

Once the test node has been activated, the activation values of the nodes that are connected logically to the test node is calculated at 308, based on the nodal weights, the edge weights, and the distribution ratios.

In an embodiment of the invention, the activation value is calculated according to equation (1):

$$w'(m_i) = w(m_i) + d_{ij} * w(e_{ij}) * w(m_j) \quad (1)$$

where $w'(m_i)$ is the updated nodal weight of a node i, $w(m_i)$ is the nodal weight of node i before activation, $w(e_{ij})$ is the edge weight of the edge connecting node i and node j, and $d_{ij}$ is the distribution ratio between node i and node j.

Thereafter, the activated nodes are stored in a list, which includes the activation values of the activated nodes. The activation values of the nodes connected logically to the test node are the updated nodal weights of the nodes.

Subsequently, another test node is selected from the queue, and the activation values of one or more nodes that are logically connected to this test node is calculated, and the list is updated. If a node already exists in the list, its activation value is updated. At 310 it is checked if the queue is empty. In case there are nodes left in the queue, 306 and 308 are repeated for the remaining nodes. Consequently, the updated list is returned as an output corresponding to input activation values. The output includes the list of activated nodes with their activation values.

Figure 4A:
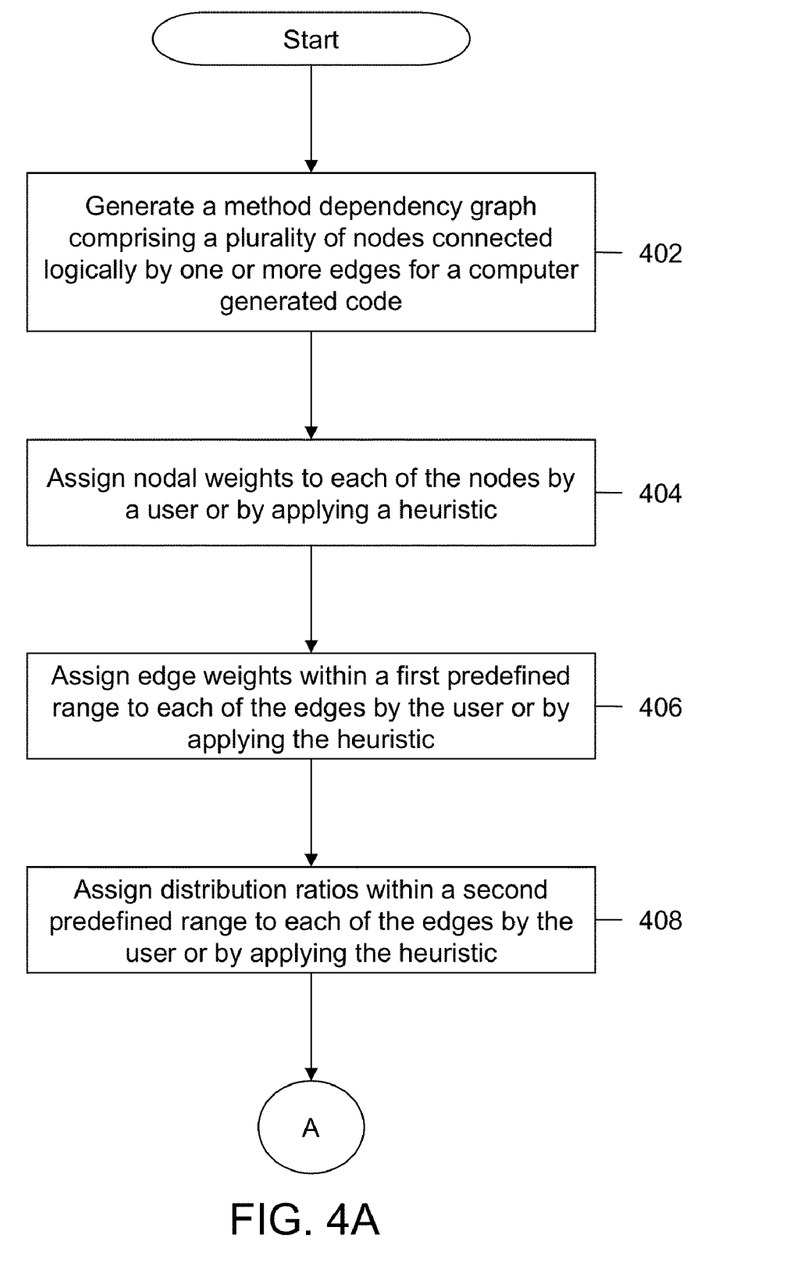
FIG. 4A and 4B is a flowchart of a method for finding an impact on a computer generated code, in accordance with another embodiment of the present invention.
Figure 4B:
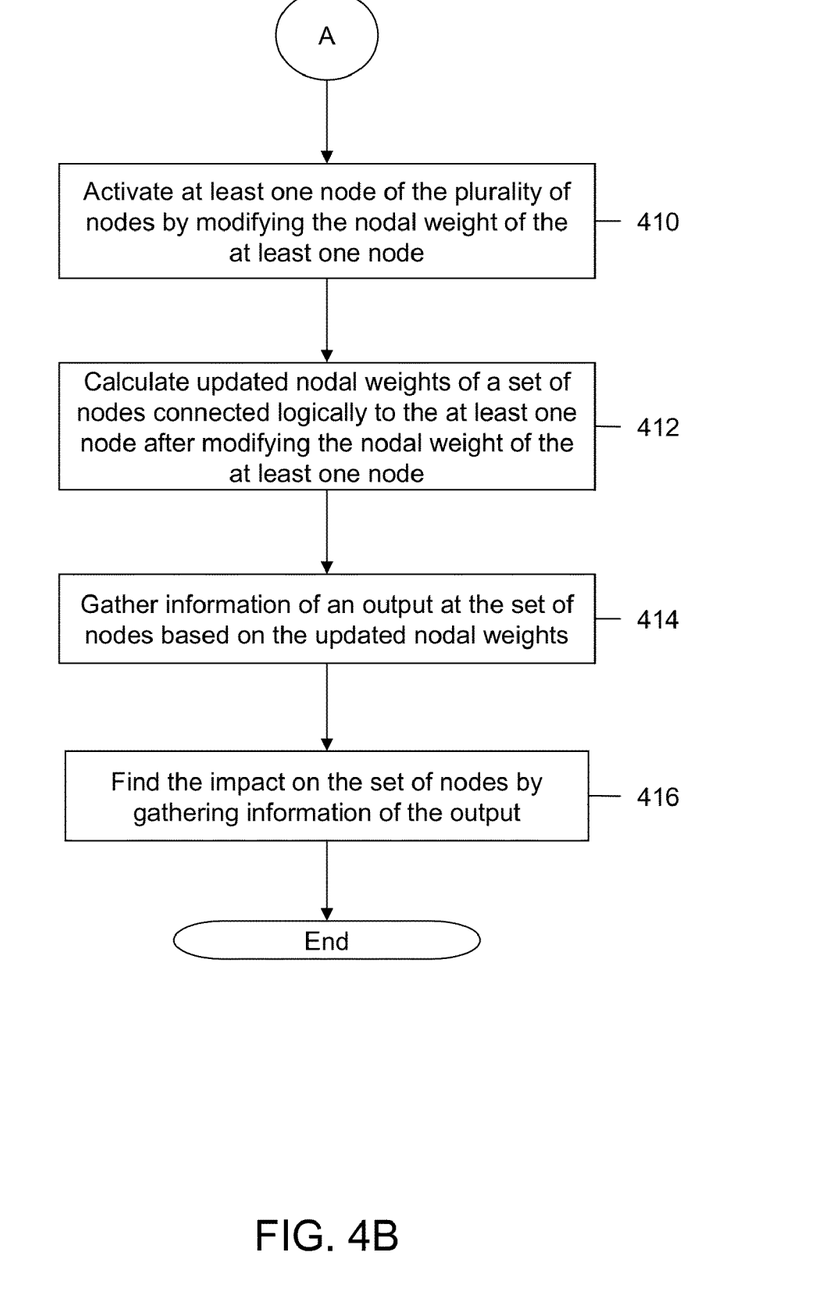

FIG. 4A and 4B is a flowchart of a method for finding an impact on a computer generated code, in accordance with another embodiment of the present invention.

At 402, a method dependency graph is generated for a computer generated code. This method dependency graph includes a plurality of nodes, such as nodes 202, which are connected logically by one or more edges, such as edges 204. Thereafter, at 404, nodal weights are assigned to the nodes, based on the predefined criterion. Each of the nodes has a non-negative weight $w(m_i)$.

Similarly, at 406, edge weights are assigned to the edges, based on the predefined criterion. Each of the edges has a non-negative weight $w(e_{ij})$ that corresponds to the weight of the edge connecting node i and node j. Further, the edge weights are assigned based on the predefined criterion in the first predefined range. At 408, distribution ratios ($d_{ij}$) are assigned to the edges, based on the predefined criterion. Furthermore, the distribution ratios are assigned based on the predefined criterion in the second predefined range. In various embodiments of the invention, the nodal weights, the edge weights and the distribution ratios can be either assigned manually by an expert or automatically by applying a heuristic.

After assigning the nodal weights, the edge weights and the distribution ratios, at least one node, such as node 202a, of the plurality of nodes is activated by modifying its nodal weight, at 410. To find the impact of a change in the computer generated code, a set of nodes that are connected logically to the activated node, such as nodes 202b, 202c and the like, are identified.

Thereafter, at 412, updated nodal weights for the set of nodes that are connected logically to the at least one node is calculated. When the at least one node is activated, the activation spreads to the logically connected nodes, based on the propagation constraints. Further, the activation values of the logically connected nodes are calculated based on equation (1). Thereafter, the activated nodes are stored as a list, which includes the activation values of the activated nodes. These activation values that are logically connected to the test node are the updated nodal weights of the nodes.

In an exemplary embodiment of the present invention, nodal weights are assigned to nodes 202, based on the predefined condition, the nodal weight assigned to node 202a is 0.9, that assigned to node 202b is 1, and that assigned to node 202c is 0.6. Thereafter, edges 204 are assigned edge weights. The edge weight assigned to edge 204a is 0.9 and that assigned to edge 204b is 0.6. In addition, distribution ratios are assigned to edges 204. The distribution ratio assigned to edge 204a is 1, and that assigned to edge 204b is 0.7. Thereafter, node 202a is activated, and its activation value is 0.8.

Node 202b is logically connected to node 202a. The updated nodal weight of node 202b would be its nodal weight ($w'(m_2)$), as calculated from equation (1):

$w'(m_2)=1+1*0.9*0.8=1.72$, where the initial value of the nodal weight of node 202b ($w(m_2)$) was 1, as assigned, based on the predefined criterion.

Node 202c is connected logically to node 202b. The updated nodal weight of node 202c ($w'(m_3)$) would be its nodal weight ($w'(m_3)$), as calculated from equation (1):

$w'(m_3)=0.6+0.7*0.6*1.72=1.3224$, where the nodal weight of node 202c ($w(m_3)$) was 0.6, as assigned, based on the predefined criterion.

Similarly, the updated nodal weights of the set of nodes that are connected logically to node 202a are calculated. Thereafter, the activated nodes are stored in a list with their activation values.

In the exemplary embodiment, the activated nodes, with their activated values, are stored in the following list:

[(202a, 0.8), (202b, 1.72), (202c, 1.3224), . . . ]

In addition, node 202c may be activated due to the activation of node 202a. Further, the nodal weight of node 202c may not change due to the propagation constraints or when determined, based on the calculation that using equation (1). However, the activation value of node 202c may change due to the activation of node 202b. Hence, the activation value of node 202c will be activated accordingly.

At 414, information about an output is gathered. To find the impact of the change, the activation values of the set of nodes that are connected logically to the at least one node is found. The list is generated, based on the activation value of the at least one node. Further, the list is returned as the output due to the activation of the at least one node.

At 416, the impact on the set of nodes that are connected logically to the at least one node is found by gathering information about the output, which includes all the activated nodes with their activation values. The activation values of the set of nodes represent their impact on the nodes due to the activation of the at least one node. In the exemplary embodiment, the impact on node 202b, due to the activation of node 202a, is that the nodal weight of node 202b changes from 1 to 1.72. Similarly, the impact on node 202c is that the nodal weight of node 202c changes from 0.6 to 1.3224. Thus, the nodes with the highest nodal weights can be considered for analyzing the impact of the change to the at least one node.

Based on the impact of the change, the user can then modify the computer generated code. To find out the impact that will be caused by the changes made to the software system, the user can repeat the method for different sets of nodes. The above method can also be applied to determine the cumulative impact of a change on multiple nodes. Further, the user can adjust the nodal weights, the edge weights, and the distribution ratios, after having analyzed the impact caused by the corresponding changes. Accordingly, the user can change the methods and classes of the computer generated code, thereby configuring the computer generated code to incorporate the desired changes.

Figure 5:
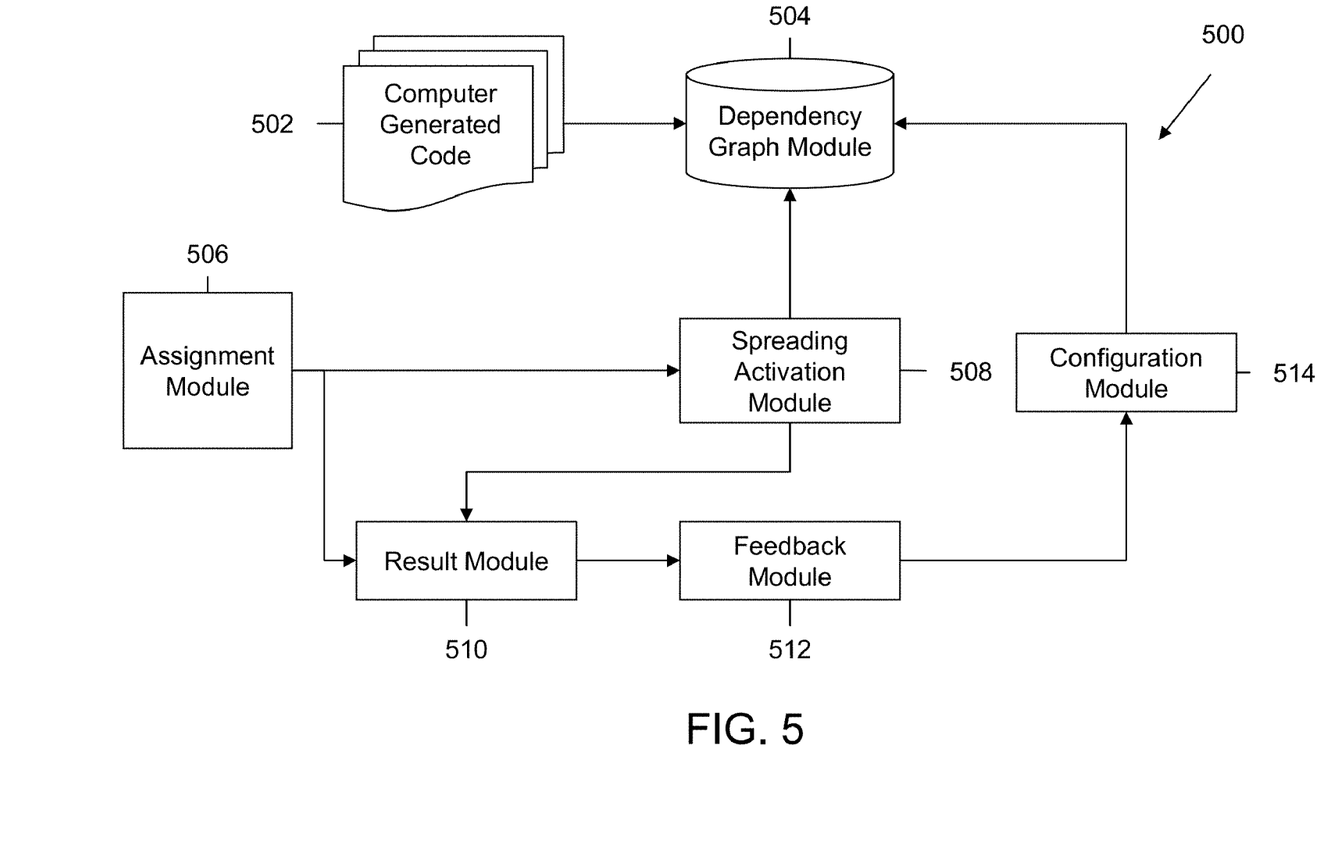
FIG. 5 illustrates an exemplary system for finding an impact on a computer generated code, in accordance with various embodiments of the present invention.

FIG. 5 illustrates an exemplary system 500 for finding an impact on a computer generated code, in accordance with various embodiments of the present invention. System 500 includes a computer generated code 502, a dependency graph module 504, an assignment module 506, a spreading activation module 508, a result module 510, a feedback module 512, and a configuration module 514.

Computer generated code 502 is the source code of a software system. Dependency graph module 504 generates a dependency graph from computer generated code 502. The dependency graph includes a plurality of nodes connected logically by one or more edges. Thereafter, assignment module 506 is utilized to identify a set of nodes from the dependency graph for which impact needs to be gathered. In an embodiment of the present invention, assignment module 506 can take an input from an expert who manually identifies the set of nodes and assigns the nodal weights, edge weights and distribution ratio. In another embodiment of the present invention, assignment module 506 can take the input from a heuristic which automatically identifies the set of nodes and assigns the nodal weights, edge weights and distribution ratios.

Once the set of nodes have been identified, assignment module 506 assigns nodal weights to the set of nodes along with and edge weights and distribution ratios to the edges of the set of nodes. Subsequently, spreading activation module 508 applies the spreading activation technique on a root node, such as node 202a in FIG. 2. of the set of nodes. Spreading activation technique has been explained in detail in conjunction with FIG. 3.

Further, result module 510 retrieves the results of the spreading activation technique applied by spreading activation module 508. In addition, feedback module 512 is configured to incorporate feedback on results obtained from result module 510. Based on the results and feedback obtained, configuration module 514 can apply changes in computer generated code 502. In an embodiment of the present invention, an expert provides feedback on the results.

Figure 6:
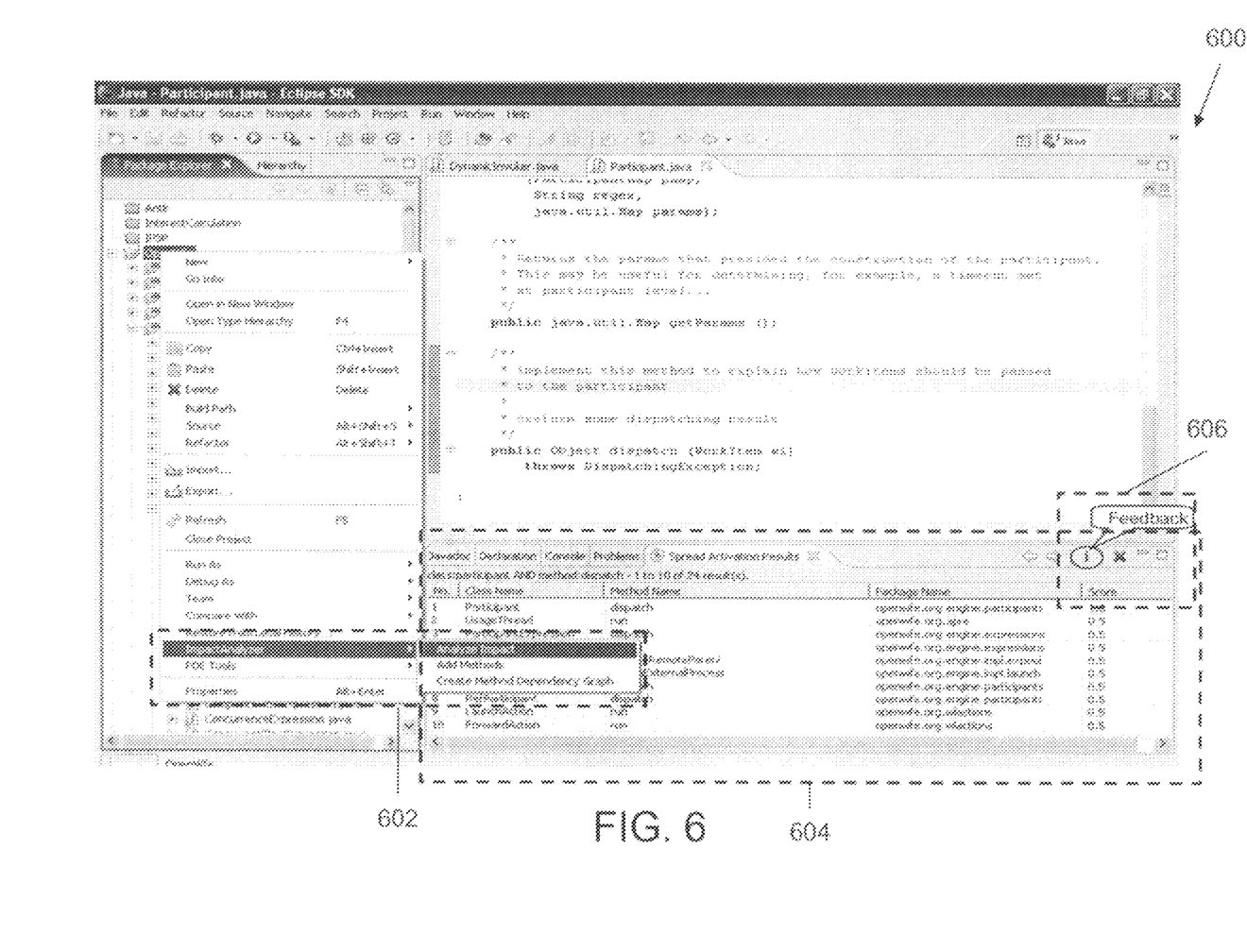
FIG. 6 is a sample snapshot of an exemplary software implementation of the exemplary system for finding an impact on the computer generated code, in accordance with an embodiment of the present invention.

FIG. 6 is a sample snapshot 600 of an exemplary software implementation of system 500 for finding an impact on computer generated code 502, in accordance with an embodiment of the present invention. Snapshot 600 includes an impact analyzer module 602, a spreading activation result module 604 and a feedback aggregator 606. Snapshot 600 is used to find an impact of a change in computer generated code 502.

A user or an expert selects impact analyzer module 602 from the menu in order to create a dependency graph. Similarly, the user then selects impact analyzer module 602 to identify the set of nodes for which an impact needs to be detected. The user can then assign nodal weights for the set of nodes and also assign edge weights and distribution ratios for the edges connecting the set of nodes. Thereafter, the user again selects impact analyzer module 602 to find the impact on the set of nodes.

Subsequently, spreading activation result module 604 displays the spreading activation result. In an embodiment of the present invention, spreading activation result module 604 displays the name of the class, the name of the corresponding method, the name of the corresponding package, and the score. The score is the activation value for the method and indicates the final impact on the method. The user can further select feedback aggregator 606 to provide feedback on the spreading activation results.

The method described above has several advantages. It provides a user with flexibility in finding the impact caused by various changes, thereby enabling the user to identify the critical methods. Further, the computational expense involved in finding the impact is less than that of the slicing techniques for finding the impact, since the method does not involve identifying a collection of statements or simulating test cases for complex systems. In addition, the method enables quantification of the methods of the computer generated code, by assigning nodal weights to the nodes and edge weights and distribution ratios are to the edges. Hence, the dependency between the methods is also quantified. Therefore, the method enables identification of the inter-relationships between the methods of the computer generated code, thereby enabling a user to identify the impact accurately.

Various embodiments of the present invention provide a method and system for finding the impact of a change on a computer generated code. The method and system, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer comprises a microprocessor, which is connected to a communication bus. The computer also includes a memory, which may include a Random Access Memory (RAM) and a Read Only Memory (ROM). The computer system also comprises a storage device, which can be a hard disk drive or a removable storage drive such as a floppy disk drive, an optical disk drive, and the like. The storage device can be other similar means for loading computer programs or other instructions into the computer system.

The computer system executes a set of program instructions that are stored in one or more storage elements, to process input data. These storage elements can also hold data or other information, as desired, and may be in the form of an information source or a physical memory element present in the processing machine. Exemplary storage elements include a hard disk, a DRAM, an SRAM and an EPROM. The storage element may be external to the computer system, and connected to or inserted into the computer, to be downloaded at or prior to the time of use. Examples of such external computer program products are computer readable storage mediums such as CD-ROMS, Flash chips, floppy disks, and the like.

The set of program instructions may include various commands that instruct the processing machine to perform specific tasks, such as the steps that constitute the method of the present invention. The set of instructions may be in the form of a computer generated code or a software program. The software or computer generated code may be in various forms, such as system or application software. Further, the software or computer generated code may be in the form of a collection of separate programs, a program module with a larger program, or a portion of a program module. The software or computer generated code may also include modular programming in the form of object-oriented programming. The software program containing the set of instructions can be embedded in a computer program product, for use with a computer, the computer program product comprising a computer usable medium with a computer readable program code that is embodied therein. Processing of input data by the processing machine may be in response to users' commands, to the results of previous processing, or to a request made by another processing machine.

The modules described herein may include processors and program instructions that are used to implement the functions of the modules described herein. Some or all the functions can be implemented by a state machine that has no stored program instructions, or in one or more application-specific integrated circuits (ASICs), in which each function or some combinations of some of the functions are implemented as custom logic.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention.

What is claimed is:

1. A method for determining impact of a modification of computer generated code, the method comprising:
   a. reading a computer generated code from a computer memory;
   b. generating a dependency graph representing the computer generated code that is sought to be modified, the dependency graph comprising a plurality of nodes connected logically by one or more edges, wherein each node represents a method within the computer generated code prior to modification;
   c. assigning nodal weights to each of the plurality of nodes, wherein the nodal weights are assigned based on a predefined criteria;
   d. assigning edge weights to each of the one or more edges;
   e. assigning distribution ratios to each of the one or more edges;
   f. representing modification of a method within the computer generated code by activating a first node corresponding to the method in the dependency graph, wherein activation comprises modifying the nodal weight assigned to the first node;
   g. propagating impact of activation of the first node in the dependency graph to one or more nodes logically connected to the first node, by calculating and assigning a modified nodal weight to each of the one or more logically connected nodes based on the modified nodal weight assigned to the first node; and h. determining the impact of modification of the method within the computer generated source code, based on at least one of the modified nodal weights of the one or more logically connected nodes;

wherein the nodal weights, the edge weights and the distribution ratios are assigned by a user, and the modified nodal weight assigned to a logically connected node is calculated according to the formula:

$$w'(m_i) = w(m_i) + d_{ij} * w(e_{ij}) * w(m_j),$$

wherein $w'm$ is the modified nodal weight of a node i, $w(m_i)$ is the nodal weight of node i prior to modification, $w(m_j)$ is the modified nodal weight of a logically connected preceding node $w(e_{ij})$ is the edge weight of the edge connecting node i and node j, and $d_{ij}$ is the distribution ratio assigned to the edge connecting node i and j.

2. The method according to claim 1, wherein the nodal weights, the edge weights and the distribution ratios are assigned automatically by applying a heuristic.

3. The method according to claim 1, wherein the modified nodal weight assigned to a logically connected node is additionally based on edge weights and distribution ratios assigned to edges connecting the first node to the logically connected node.

4. The method according to claim 3 further comprises a user configuring the computer generated code based on the modified nodal weights.

5. The method according to claim 1, wherein the edge weights are assigned within a first predefined range.

6. The method according to claim 1, wherein the distribution ratios are assigned within a second predefined range.

7. The method according to claim 1, wherein the dependency graph is a method dependency graph.

8. A computer program product for determining impact of a modification of computer generated code, the computer program product comprising a non-transitory computer usable medium having computer readable instructions for:

a. generating a dependency graph representing a computer generated code that is sought to be modified, the dependency graph comprising a plurality of nodes connected logically by one or more edges, wherein each node represents a method within the computer generated code prior to modification;

b. assigning nodal weights to each of the plurality of nodes, wherein the nodal weights are assigned based on a predefined criteria;

c. assigning edge weights to each of the one or more edges;

d. assigning distribution ratios to each of the one or more edges;

e. representing modification of a method within the computer generated code by activating a first node corresponding to the method in the dependency graph, wherein activation comprises modifying the modal weight assigned to the first node;

f. propagating impact of activation of the first node in the dependency graph to one or more nodes logically connected to the first node, by calculating and assigning a modified nodal weight to each of the one or more logically connected nodes based on the modified nodal weight assigned to the first node; and g. determining the impact of modification of the method within the computer generated source code, based on at least one of the modified nodal weights of the one or more logically connected nodes;

wherein the nodal weights, the edge weights and the distribution ratios are assigned by a user, and the modified nodal weight assigned to a logically connected node is calculated according to the formula:

$$w'(m_i) = w(m_i) + d_{ij} * w(e_{ij}) * w(m_j),$$

wherein $w'(m_i)$ is the modified nodal weight of a node i, $w(m_j)$ is the nodal weight of node i prior to modification $w(m_i)$ is the modified nodal weight of a logically connected receding node $w(e_{ij})$ is the edge weight of the edge connecting node i and node j, and $d_{ij}$ is the distribution ratio assigned to the edge connecting node i and j.

9. The computer program product according to claim 8, further having computer readable instructions for automatically assigning the nodal weights, the edge weights and the distribution ratios.

10. The computer program product according to claim 8, further comprising computer readable instructions for configuring the computer generated code based on the modified nodal weights.

* * * * *